(12) United States Patent
Alexander, III et al.

(10) Patent No.: US 6,507,946 B2
(45) Date of Patent: *Jan. 14, 2003

(54) PROCESS AND SYSTEM FOR JAVA VIRTUAL METHOD INVOCATION

(75) Inventors: William Preston Alexander, III, Austin, TX (US); Weiming Gu, Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,634

(22) Filed: Jun. 11, 1999

(65) Prior Publication Data

US 2002/0144243 A1 Oct. 3, 2002

(51) Int. Cl.$^7$ ................................................ G06F 9/45
(52) U.S. Cl. ...................... 717/145; 717/140; 717/151; 717/158; 717/157; 714/35; 709/315
(58) Field of Search .......................... 717/4, 5, 9, 145, 717/140, 151, 157, 158; 714/35, 45, 47; 709/315, 234

(56) References Cited

U.S. PATENT DOCUMENTS

| | | | |
|---|---|---|---|
| 4,989,132 A | * 1/1991 | Mellender et al. | 717/139 |
| 5,230,050 A | * 7/1993 | Iitsuka et al. | 717/145 |
| 5,613,120 A | * 3/1997 | Palay et al. | 717/165 |
| 5,950,003 A | * 9/1999 | Kaneshiro et al. | 717/4 |
| 5,970,249 A | * 10/1999 | Holzle et al. | 717/5 |
| 6,026,485 A | * 2/2000 | O'Connor et al. | 712/226 |
| 6,041,179 A | * 3/2000 | Bacon et al. | 717/116 |
| 6,072,951 A | * 6/2000 | Donovan et al. | 717/158 |
| 6,101,326 A | * 8/2000 | Mattson, Jr. | 717/151 |
| 6,161,217 A | * 12/2000 | Detlefs et al. | 717/5 |
| 6,195,793 B1 | * 2/2001 | Schmidt | 717/9 |
| 6,199,201 B1 | * 3/2001 | Lamping et al. | 717/114 |
| 6,223,340 B1 | * 4/2001 | Detlefs | 717/5 |
| 6,237,141 B1 | * 5/2001 | Holzle et al. | 717/9 |
| 6,401,137 B1 | * 6/2002 | Wolczko et al. | 709/315 |

OTHER PUBLICATIONS

Title: Efficient Dynamic Dispatch without Virtual Function Tables. The SmallEiffel Compiler, author: Zendra et al, ACM, 1997.*
Title: Debugging Optimized Code with Dynamic Deoptimization, author: Holzle et al, ACM, 1992.*
Titlel The Jalapeno Dynamic Optimizing Compiler for Java TM, author: Burke et al, ACM, Jun. 1999.*

* cited by examiner

*Primary Examiner*—Gregory Morse
*Assistant Examiner*—Chameli C. Das
(74) *Attorney, Agent, or Firm*—Duke W. Yee; Leslie Van Leeuwen; Michael R. Nichols

(57) ABSTRACT

A process and system for optimizing an invocation of a method is provided. A determination is made to compile a calling method, and a call to a callee method is detected within the first method. The callee method may be a non-final, virtual method, and a determination may be made that the callee method has not been previously overridden. The callee method is then inlined within the first method. In addition, no conditional statements are inserted into the calling method along with the inlined method. The determination to compile and optimize these methods may be made by a just-in-time compiler, and if the methods are Java methods, then a Java just-in-time compiler performs the optimization process. If a determination is made to load a class that contains a method that overrides the callee method, then the calling method is recompiled or patched.

17 Claims, 5 Drawing Sheets

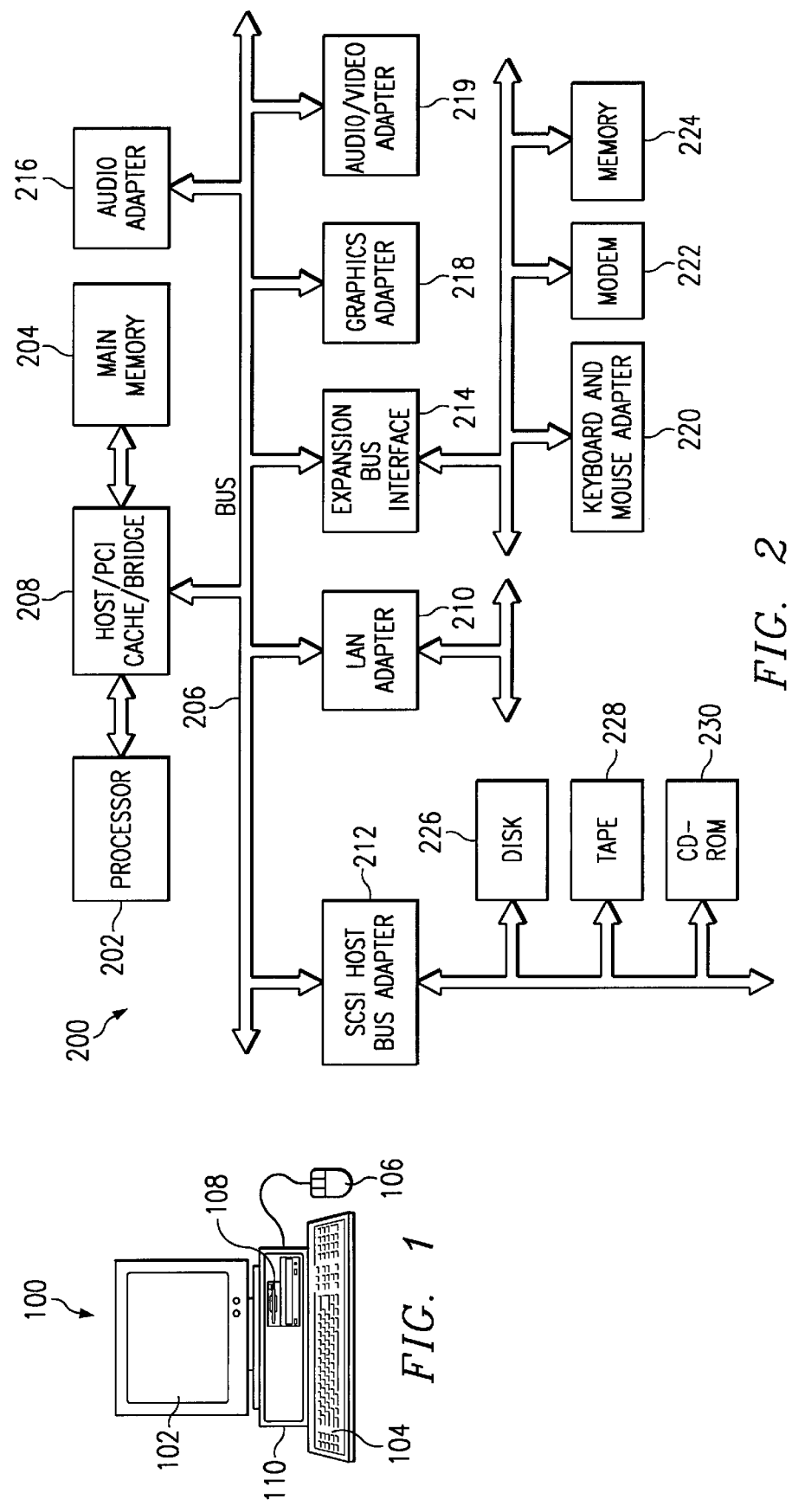

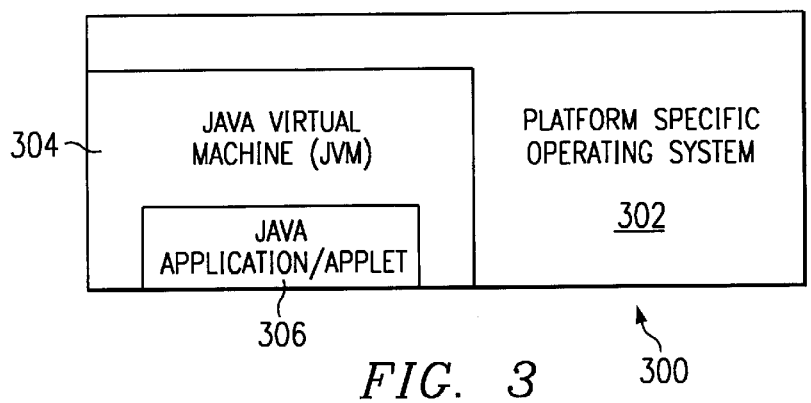

FIG. 3

```
class Figure5A { public int Figure5method1(boolean byte1, char char1, double double1, short short1) {
        return 0;
    } public static int Figure5method2(byte byte2, double double2, float float2, Object object2,
int integer2, long long2) {
        return 0;
    }

Figure5method1()
INSTANCE METHOD

| INDEX | DATA TYPE | METHOD PARAMETER |
|---|---|---|
| 0 | REFERENCE | HIDDEN THIS |
| 1 | INT | BYTE BYTE1 |
| 2 | INT | CHAR CHAR1 |
| 3 | DOUBLE | DOUBLE DOUBLE1 |
| 5 | INT | SHORT SHORT1 |

Figure5method2()
CLASS METHOD

| INDEX | DATA TYPE | METHOD PARAMETER |
|---|---|---|
| 0 | INT | BYTE BYTE2 |
| 1 | DOUBLE | DOUBLE DOUBLE2 |
| 3 | FLOAT | FLOAT FLOAT2 |
| 4 | REFERENCE | OBJECT OBJECT2 |
| 5 | INT | INT INTEGER 2 |
| 6 | LONG | LONG LONG2 |

FIG. 5B

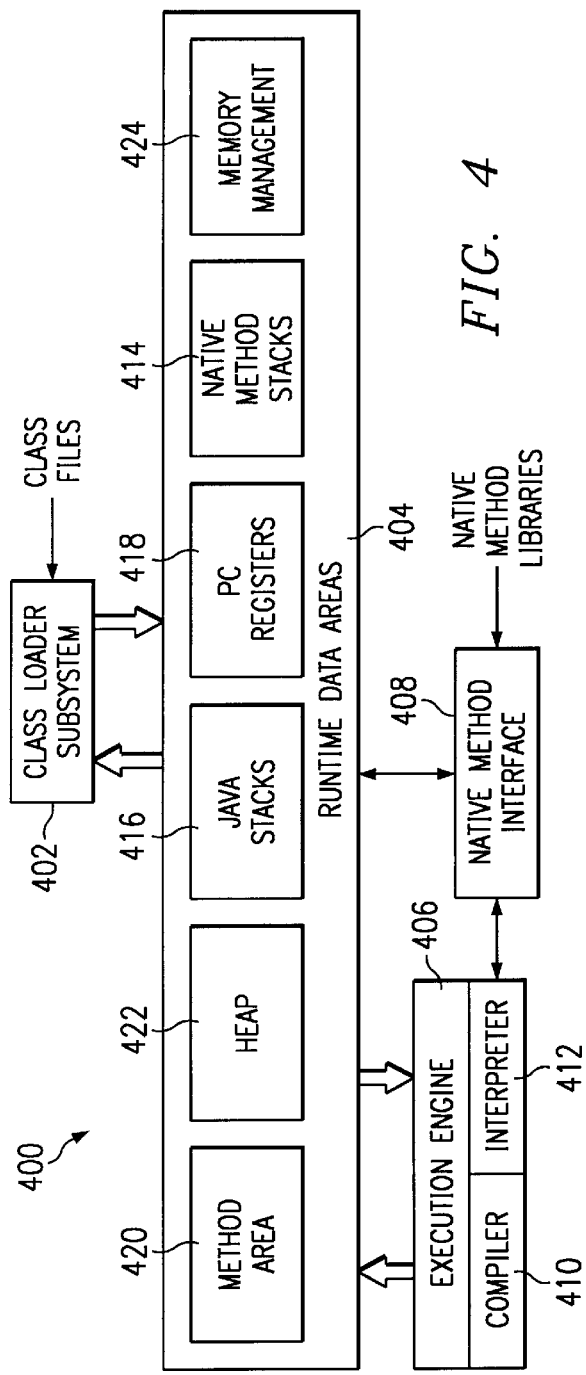

FIG. 7C
```
public void boo (SubC s) {
    ...
    s.foo(...);
    ...
};
```

FIG. 8A

Pseudo-code of method boo() compiled with conventional JIT:
```
boo() {
    ...
    if (s.foo() is SubC's foo() method) then
        inline code from SubC's foo() method;
    else
        invoke method s.foo();
    endif
    ...
}
```

FIG. 8B

Pseudo-code of method bar() optimized with present invention:
```
boo() {
    ...
    inline code from SubC's foo() method;
    ...
}
```

FIG. 9A
```
Vector origVec = new Vector(  ray.getOrigin().getX(),
                              ray.getOrigin().getY(),
                              ray.getOrigin().getZ() );
```

FIG. 9B
```
public Point getOrigin() { return Origin; }   /* in class Ray.java */
public float getX() { return X; }             /* in class Point.java */
public float getY() { return Y; }             /* in class Point.java */
public float getZ() { return Z; }             /* in class Point.java */
```

```
;; Pseudo machine code of statement ray.GetOrigin().getX() generated by conventional JIT compilers
    ;; assume r1 = instance ray's reference
    load   r2=[r1]                          ; get method table of ray
    load   r2=[r2+offset_getOrigin]         ; get method block of getOrigin()
    compare r2 ==   Ray's getOrigin()
    if not equal then goto L_10
    ;; inlined code for Ray's getOrigin
    load   r3=[r1+offset_origin_field]      ; get origin from instance r1
    goto   L_20
L_10:
    ;; have to invoke ray.getOrigin()
    save   r1                               ; save register r1 on stack
    call   [r2+compiled_code_offset]        ; invoke method getOrigin()
    load   r3=r1                            ; store return value to r3
    restore     r1                          ; restore register r1 from stack
L_20:
    ;; at this point, register r3 = ray.getOrigin()
    ;; next do r3.getX();
    load   r2=[r3]                          ; get method table of ray.getOrigin()
    load   r2=[r2+offset_getX]              ; get method block of getX()
    compare r2 == Point's getX()
    if not equal then goto L_30
    ;; inlined code for Point's getX()
    load   r4=[r2+offset_X_field]           ; get X from instance r2
    goto   L_40
L_30:
    ;; have to invoke r3.getX()
    save   r1                               ; save register r1 on stack
    call   [r2+compiled_code_offset]        ; invoke method getX()
    load   r4=r1                            ; store return value to r3
    restore     r1                          ; restore register r1 from stack
L_40:
    ;; at this point, register r4 contains the result
```

*FIG. 9C*

```
;;Pseudo machine code of statement ray.GetOrigin().getX() generated by the present invention
    ;; assume r1 = instance ray's reference
    load   r2=[r1+offset_origin_field]      ; get origin from instance r1
    load   r4=[r2+offset_X_field]           ; get X from origin
    ;; at this point, register r4 contains the result
```

*FIG. 9D*

PROCESS AND SYSTEM FOR JAVA VIRTUAL METHOD INVOCATION

TECHNICAL FIELD

The present invention relates generally to an improved data processing system and, in particular, to a process and system for improved execution performance in a Java virtual machine.

DESCRIPTION OF RELATED ART

Since Java is an interpreted language, any programs written in Java, after being converted into Java class files, are interpreted by a Java virtual machine (JVM). In order to improve performance, many JVMs may compile Java classes into platform-specific binary code after they are loaded into the JVM. Then, instead of being interpreted, Java classes are executed in their compiled native code format, similar to programs written in other languages, such as C, C++, etc. Such just-in-time (JIT) compilation of Java programs can significantly improve the speed of execution of Java programs.

A high performance JIT compiler is the key to a high performance Java implementation, and one of the most important actions of a high performance JIT compiler is optimizing method invocation. Because Java is an object-oriented language, methods and method invocation are prevalent in typical Java programs. In Java, there are three kinds of method invocations: (1) static method invocation, also known as class method invocation; (2) interface method invocation; and (3) instance method invocation. An instance invocation can be a non-virtual method invocation (only for private methods and object instance initialization methods) or a virtual method invocation. While static method invocations and non-virtual instance method invocations are easier to optimize due to their static nature, interface method invocations and virtual instance method invocations are the most prevalent in Java. Therefore, improving virtual and interface method invocation is very important for the overall performance of a JIT compiler.

In Java, a virtual method can be declared final. A final method can not be overridden by any subclass, which prevents malicious modification of trusted and verified code and ensures consistency. Hence, invocations of final methods can be more easily optimized by the JIT compiler than those of regular virtual methods.

An important technique of method invocation optimization is called inlining. A method is inlined if its code is compiled into the calling method's context. Both static and non-virtual methods can be inlined. Final virtual methods, typically though not always, can be inlined. However, a disadvantage is that regular virtual methods cannot be directly inlined.

Inlining has important benefits. It dramatically reduces the frequency of method invocations, which saves the time needed to perform those method invocations. More importantly, inlining is synergistic with other code optimizations because it makes those optimizations more effective. Inlining produces much larger blocks of code for the optimizer to work on. This provides a situation that significantly increases the effectiveness of traditional compiler optimizations, thus overcoming a major obstacle to increased Java programming language performance.

Therefore, in order to improve the performance of certain Java programs, it would be advantageous to provide a JIT compiler with the ability to improve the performance of a program by improving the manner in which its methods are invoked. It would be particularly advantageous to provide a consistent process by which the invocation of virtual methods may be optimized.

SUMMARY OF THE INVENTION

The present invention provides a process and system for optimizing an invocation of a method. A determination is made to compile a calling method, and a call to a callee method is detected within the first method. The callee method may be a non-final, virtual method, and a determination may be made that the callee method has not been previously overridden. The callee method is then inlined within the first method. In addition, no conditional statements are inserted into the calling method along with the inlined method. The determination to compile and optimize these methods may be made by a just-in-time compiler, and if the methods are Java methods, then a Java just-in-time compiler performs the optimization process. If a determination is made to load a class that contains a method that overrides the callee method, then the calling method is recompiled or patched.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention;

FIG. 2 is a block diagram illustrating internal components of a data processing system that may implement the present invention;

FIG. 3 is a block diagram illustrating the relationship of software components operating within a computer system that may implement the present invention;

FIG. 4 depicts a block diagram of a Java virtual machine in accordance with a preferred embodiment of the present invention;

FIGS. 5A–5B depict examples of Java source code and its effects on Java stack frames;

FIGS. 6A–6C depict a series of classes that explain virtual methods and final methods;

FIGS. 7A–7C depict a series of examples of virtual method invocations that explain the differences among virtual method invocations;

FIGS. 8A–8B depict a series of examples of pseudocode that explain the manner in which the present invention inlines virtual methods to improve method invocation performance; and FIGS. 9A–9D are a series of examples of Java code and assembly code that explain the manner in which the present invention inlines virtual methods to improve method invocation performance.

DETAILED DESCRIPTION OF THE PREFERRED EMBODIMENT

With reference now to FIG. 1, a pictorial representation depicts a data processing system in which the present invention may be implemented in accordance with a preferred embodiment of the present invention. A personal computer 100 is depicted, which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of system software residing in computer readable media in operation within computer 100.

With reference now to FIG. 2, a block diagram illustrates internal components of a data processing system that may implement the present invention. Data processing system 200 is an example of a personal computer, such as computer 100 in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide nonvolatile memory for storing operating system files and/or user-generated data.

Other examples for data processing system 200 include an Internet information appliance for surfing the Internet and the World Wide Web. Internet information appliances may include Web-based interactive television set-top boxes. The depicted example in FIG. 2 and above-described examples are not meant to imply architectural limitations.

With reference now to FIG. 3, a block diagram illustrates the relationship of software components operating within a computer system that may implement the present invention. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

The present invention provides a process and system for Java virtual method invocation. Hence, the present invention operates in conjunction with a Java virtual machine yet within the boundaries of a JVM as defined by Java standard specifications. In order to properly present the present invention, portions of the operation of a Java virtual machine according to Java specifications are herein described.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

A JVM must load class files and execute the bytecodes within them. The Java virtual machine contains a class loader, which loads class files from an application and the class files from the Java application programming interfaces (APIs) which are needed by the application. The execution engine that executes the bytecodes may vary across platforms and implementations.

The simplest type of software-based execution engine is a just-in-time compiler. With this type of execution, the bytecodes of a method are compiled to native machine code upon the first invocation of the method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java run-time environment may have two kinds of methods: Java and native. A Java method is written in the Java language, compiled to bytecodes, and stored in class files. A native method is written in Java or some other language and compiled to the native machine code of a particular processor. Native methods are stored in a dynamically linked library whose exact form is platform specific.

With reference now to FIG. 4, a block diagram of a Java virtual machine is depicted in accordance with a preferred embodiment of the present invention. Java virtual machine (JVM) 400 includes a class loader subsystem 402, which is a mechanism for loading types, such as classes and interfaces, given fully qualified names. JVM 400 also contains runtime data areas 404, execution engine 406, native method interface 408, and memory management 424. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java stacks 416, PC registers 418, method area 420, and heap 422. These different data areas represent the organization of memory needed by JVM 400 to execute a program.

Java stacks 416 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well-defined for a variety of platform architectures.

PC registers 418 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas. In some Java virtual machine implementations, such as some IBM developed JVMs, native method stacks 414 and Java stacks 416 are combined.

Method area 420 contains class data while heap 422 contains all instantiated objects. The JVM specification strictly defines data types and operations. Most JVM implementations choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 422. JVM 400 includes an instruction that allocates memory space within the memory for heap 422 but includes no instruction for freeing that space within the memory. Memory management 424 in the depicted example manages memory space within the memory allocated to heap 420. Memory management 424 may include a garbage collector which automatically reclaims memory used by objects that are no longer referenced by an application. Additionally, a garbage collector also may move objects to reduce heap fragmentation.

With reference now to FIGS. 5A–5B, examples of Java source code and its effects on Java stack frames are provided. FIG. 5A provides examples of Java programming language source code statements for an instance method, also known as a virtual method, and a class method, also known as a static method. FIG. 5B depicts the state of a local variables section of a stack frame.

The local variables section contains a method's parameters and local variables. Compilers place the parameters into the local variable array first, in the order in which they are declared. FIG. 5B shows the local variables section for the two methods shown in FIG. 5A.

FIG. 5B shows that the first parameter in the local variables section for an instance method "Figure5method1( )" is of type "reference", even though no such parameter appears in the source code. This reference is the hidden "this" passed to every instance method. Instance methods use this reference to access the instance data of the object upon which they were invoked. As shown for the local variables for a class method "Figure5method2( )", class methods do not receive a hidden "this". Class methods are not invoked on objects. A class's instance variables cannot be accessed from a class method because no instance is associated with the method invocation.

Data types "byte", "short", "char", and "boolean" in the source code of FIG. 5A have data type "int" in the local variables and operand portions of the stack. Each is manipulated as an "int" while on the stack frame and then converted back into the proper type when stored in the heap or method area.

All objects are passed by reference, such as "Object Object2" that is passed as a reference to "Figure5method2( )". In Java, all objects are passed by reference. Therefore, only object references appear on the stack.

During method invocation, the difference between class (static) methods and instance (virtual or non-virtual) methods is as follows: instance methods require an instance before they can be invoked, whereas class methods do not; and instance methods need to use dynamic (late) binding at actual method invocation time, whereas all class methods use static (early) binding at method name resolution time. When a class method is invoked, its class name needs to be explicitly specified, which can be resolved and bound at JIT compile-time. When a virtual instance method is invoked, the actual method is selected based on the actual class of the object, which may be known only at run-time.

References to methods are initially symbolic. All invoke instructions refer to a constant pool entry that initially contains a symbolic reference. When the JVM encounters an invoke instruction, if the symbolic reference has not yet been resolved, the JVM resolves it as part of the execution of the invoke instruction.

To resolve a symbolic reference, the JVM locates the method being referred to symbolically and replaces the symbolic reference with a direct reference. A direct reference, such as a pointer or offset, allows the JVM to invoke the method more quickly if the reference is ever used again in the future.

During resolution, the JVM also performs several verification checks. These checks ensure that Java language rules are followed and that the invoke instruction can be safely executed. First, the JVM ensures that the symbolically referenced method exists. If it exists, it ensures that the current class can legally access the method. For example, if the method is private, it must be a member of the current class. If any of these checks fail, the JVM throws an exception. After the method has been resolved, then the JVM is ready to invoke it. As can be seen, method invocation may incur significant overhead.

In the prior art, inlining methods in the caller's context (method inlining) is a JIT optimization technique for improving the performance of method invocation. Namely, bytecodes of the callee methods are copied into the caller's context at JIT compilation time. The bytecodes of the caller method and the inlined callee method are then compiled into native machine code. Therefore, when the caller method is executed, the callee method is also executed within the caller method when necessary, and the actual method invocation is avoided at runtime. However, not all methods can be inlined. The JIT compiler imposes a number of limitations, such as the restriction that inlined methods need to be static methods, non-virtual methods, or final virtual methods. It seems intuitive that non-final virtual methods cannot be inlined because the method actually invoked is determined at run-time by the actual class type of the instance reference involved in the method invocation.

Methods that have been explicitly declared final cannot be overridden by any subclass. At JIT compilation time, the JIT compiler can determine the actual methods involved in the method invocations. Therefore, the JIT compiler can inline these methods.

The present invention improves upon prior art invocation processes by assuming that a virtual method, if not overridden by any class, is a final method until it is explicitly overridden. By doing so, the present invention can speculatively inline a regular virtual method.

With reference now to FIGS. 6A–6C, a series of classes explain virtual methods and final methods. FIG. 6A shows an example of class SuperA with a virtual method foo( ) defined in the class. FIG. 6B shows an example of class SubB with a final virtual method foo( ). Since class SubB extends class SuperA, i.e. class SubB is a subclass of class SuperA or class SuperA is a super class of class SubB, method foo( ) of class SubB overrides method foo( ) of class SuperA.

FIG. 6C shows another example of class SubC with a virtual method foo( ). Since class SubC extends class SuperA, method foo( ) of class SubC overrides method foo( ) of class SuperA.

With reference now to FIGS. 7A–7C, a series of examples of virtual method invocations explain the differences among these virtual method invocations.

FIG. 7A shows pseudocode of a method bar ( ) which contains an invocation of a virtual method foo( ) of class SuperA. Since method foo( ) of class SuperA is explicitly overridden by method foo( ) of either class SubB or class SubC, the method invocation in bar ( ) can not be optimized by the process of the present invention.

FIG. 7B shows pseudocode of another method moo( ) which contains an invocation of a final virtual method foo( ) of class SubB. Since method foo( ) of class SubB is a final method, the final method invocation s.foo( ) can be optimized by prior art JIT compilers.

FIG. 7C shows pseudocode of another method boo( ) which contains an invocation of a virtual method foo( ) of class SubC. Assume at JIT compilation time, there is no subclass of class SubC which overrides method foo( ). Since method foo( ) of class SubC is a virtual method and it is not overridden yet, the method invocation s.foo( ) can be assumed final, and it can be optimized by the process of the present invention.

With reference now to FIGS. 8A–8B, a series of examples of pseudocode explain the manner in which the present invention inlines virtual methods to improve method invocation performance. In prior art JIT compilers, invocation of method s.foo( ) in FIG. 7C can not be directly inlined because it is not bound at JIT compilation time. Instead, it can be speculatively inlined, as illustrated by pseudocode statements in FIG. 8A. By checking whether s.foo( ) is class SubC's foo( ) method, the process ensures that the method has not been previously overridden and that the inlining of the method will properly execute as expected.

Note that the approach shown in FIG. 8A may not be particularly efficient for two reasons: (1) the overhead of checking for subclasses and overridden methods may be significant if foo( ) is a small method, i.e. the checking process may require more time than the method foo( ) takes to execute; and (2) the "if" statement prevents the optimization of the inlined code during optimization of method boo( ) because compiler optimization is typically based on basic blocks, and the additional branch statement breaks the original one block into three or four basic blocks.

To improve on the speculative inlining shown in FIG. 8A, the present invention treats virtual methods that have not yet been overridden as regular final methods. Virtual methods in Java, if not explicitly declared final, may potentially be overridden if subclassed. However, at a given point of time, many virtual methods are not overridden in the JVM. For such methods, their behavior is the same as those explicitly declared final.

Virtual methods that are treated as final methods may participate in many optimizations available to the JIT compiler. In particular, aggressive inlining can be applied to these methods. FIG. 8B shows pseudocode statements that are optimized with the present invention for method boo( ) shown in FIG. 7C. If class SubC is not currently subclassed in the JVM and if SubC's foo( ) method satisfies the JIT compiler's inlining policies, then method s.foo( ) can be fully inlined into the context of method boo( ) when method boo( ) is compiled. Note that no branching is needed around SubC's foo( ), as is the case in FIG. 8A.

However, the JVM and the JIT keep track of dependencies among methods. Each JIT compiled method stores a list of all the methods which are inlined because they are assumed final. The depedency lists can be maintained by either JIT or JVM. When a class is loaded into the JVM at run-time, the JVM and JIT find all the methods overridden by newly loaded classes and invalidate or update JIT compiled code that inlines any newly overridden method. This can be achieved by simply searching the dependency lists maintained for the JIT compiled methods. For example, the JIT remembers that the compiled code of method boo( ) depends on SubC's foo( ) not having been overridden by any subclass. If a subclass of SubC is later loaded into the JVM and if foo( ) is redefined in the new class, then the JIT compiled code of method boo( ) needs to be updated to reflect the new JVM state. In that case, the code may be patched, or it may be discarded and the method recompiled.

With reference now to FIGS. 9A–9D, a series of examples of Java code and assembly code explain the manner in which the present invention inlines virtual methods to improve method invocation performance.

FIG. 9A shows an example of a Java language statement which is found in an industry standard benchmark. The Java language statement creates a vector from an origin point consisting of a point with an x-coordinate, a y-coordinate, and a z-coordinate, where getOrigin( ), getX( ), getY( ), and getZ( ) are simple methods, shown as statements in FIG. 9B. These types of small methods are encouraged by object-oriented languages, such as Java, to help encapsulate data structures. None of the four methods shown in FIG. 9B is overridden by any subclass in this benchmark.

In order to understand the cost of executing this code pattern, FIG. 9C shows some of the pseudo-assembly language code for part of the Java statement "ray.getOrigin( ).getX( )".

In the example shown in FIG. 9C, 12 instructions are needed if both methods are speculatively inlined, i.e. neither the path between label 1_10 and 1_20 or the path between label 1_30 and 1_40 is taken. Many of these instructions are computationally expensive because of the data dependencies among the instructions.

FIG. 9D shows some of the pseudo-assembly language code for part of the Java statement "ray.getOrigin( ).getX( )" after using the process of the present invention. In the process of the present invention, methods are assumed to be final methods until overridden. In the example discussed above, i.e. the Java statement "ray.getOrigin( ).getX( )", both the methods getOrigin( ) and getX( ) are considered final methods. (In fact, these methods are not overridden in the actual implementation of the benchmark.) Instructions in FIG. 9D can be generated if both methods getOrigin( ) and getX( ) are inlined and copied into the caller's context.

It should be noted that only two instructions are necessary to complete the same task as in FIG. 9C and that further optimization of the caller side is possible because of the simple code pattern. Also note that as a result of the process of the present invention being applied on the benchmark code, the time to run the benchmark test was significantly reduced.

Alternatively, the present invention may reserve this kind of optimization for "hot" methods, i.e. those that are invoked very frequently and in which a lot of execution time is spent. Any recompilation cost can be reduced if only a small number of methods are highly optimized.

The advantages of the present invention should be apparent in light of the detailed description provided above. By considering a non-final, virtual method as a final virtual method, the method may be inlined until overridden. The processing overhead for invoking the method is then eliminated. Although the JVM or JIT may recompile or patch the calling method once it is overridden, the overall performance of the code is increased. If the method is seldom overridden, then the performance decrease from recompiling the calling method is outweighed by the performance increase gained by repeatedly executing the code of the called method without invocation overhead.

A primary benefit of object-oriented programming is that it can increase development productivity by providing powerful language mechanisms for software reuse. In practice, such reusability is rarely attained. Extensive use of these mechanisms can significantly reduce performance, which leads programmers to use them sparingly. Many programmers using the Java programming language avoid using fully "virtual" methods and write larger methods, because they believe that every virtual method invocation entails a significant performance penalty. Fine-grain use of "virtual" methods (i.e. methods that are not "static" or "final" in the Java programming language) is extremely important to the construction of highly reusable classes, because each such method acts as a "hook" that allows new subclasses to modify the behavior of the superclass. However, because many methods are never overridden, the present invention treats a method as a final method until execution proves otherwise, resulting in a significant increase in performance.

A significant advantage of the approach of the present invention is that it should fit very well in a server environment where classes are loaded initially, and new classes are seldom loaded thereafter. In this case, the JVM and the JIT compiler become "stable" after a period of execution, and they remain stable for the duration of their lifetimes.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy disks, a hard disk drive, RAM, CD-ROMs, and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A process for optimizing an invocation of a method, the process comprising the computer-implemented steps of:

in response to a determination to compile a first method, detecting an invocation of a second method by the first method;

inlining the second method in the first method without a conditional statement in the first method for conditional execution of the inlined second method; and in response to a determination to load a class comprising a third method that overrides the second method, performing one of patching the first method and recompiling the first method, wherein the first method contains the second method inlined without a conditional statement.

2. The process of claim 1 wherein the second method is a non-final, virtual method.

3. The process of claim 1 further comprising:

determining that the second method has not been previously overridden.

4. A process for optimizing an invocation of a method, the process comprising the computer-implemented steps of:

in response to a determination to compile a first method, detecting a call to a second method within the first method, wherein the second method is a non-final, virtual method;

inlining the second method within the first method without a conditional statement in the first method for conditional execution of the inlined second method; and in response to a determination to load a class comprising a third method that overrides the second method, performing one of patching the first method and recompiling the first method, wherein the first method contains the second method inlined without a conditional statement.

5. The process of claim 4 wherein the second method is unconditionally inlined within the first method.

6. The process of claim 4, further comprising:

just-in-time compiling the first method with the inlined second method.

7. The process of claim 4 wherein the first method and the second method are Java methods.

8. The process of claim 4 further comprising:

determining that the second method has not been previously overridden.

9. The process of claim 4 further comprising:

maintaining a list of dependencies among methods for updating compiled methods that contain inlined methods that may be overridden.

10. A data processing system for optimizing an invocation of a method, the data processing system comprising:

detecting means for detecting, in response to a determination to compile a first method, a call to a second method within the first method, wherein the second method is a non-final, virtual method;

inlining means for inlining the second method within the first method without a conditional statement in the first method for conditional execution of the inlined second method; and at least one of patching means for patching, in response to a determination to load a class comprising a third method that overrides the second method, the first method and recompiling means for recompiling, in response to a determination to load a class comprising a third method that overrides the second method, the first method, wherein the first method contains the second method inlined without a conditional statement.

11. The data processing system of claim 10 wherein the second method is unconditionally inlined within the first method.

12. The data processing system of claim 10 further comprising:

compiling means for just-in-time compiling the first method with the inlined second method.

13. The data processing system of claim 10 wherein the first method and the second method are Java methods.

14. The data processing system of claim 10 further comprising:

determining means for determining that the second method has not been previously overridden.

15. The data processing system of claim 10 further comprising:

maintaining means for maintaining a list of dependencies among methods for updating compiled methods that contain inlined methods that may be overridden.

16. A computer program product in a computer-readable medium for use in a data processing system for optimizing an invocation of a method, the computer program product comprising:

instructions for detecting, in response to a determination to compile a first method, a call to a second method within the first method, wherein the second method is a non-final, virtual method;

instructions for inlining the second method within the first method without a conditional statement in the first method for conditional execution of the inlined second method; and instructions for performing one of patching the first method and recompiling the first method, in response to a determination to load a class comprising a third method that overrides the second method, wherein the first method contains the second method inlined without a conditional statement.

17. The computer program product of claim 16 further comprising:

instructions for determining that the second method has not been previously overridden.

* * * * *